April 2, 1929. H. E. ROSE 1,707,573
VALVE LATCH
Filed March 29, 1927
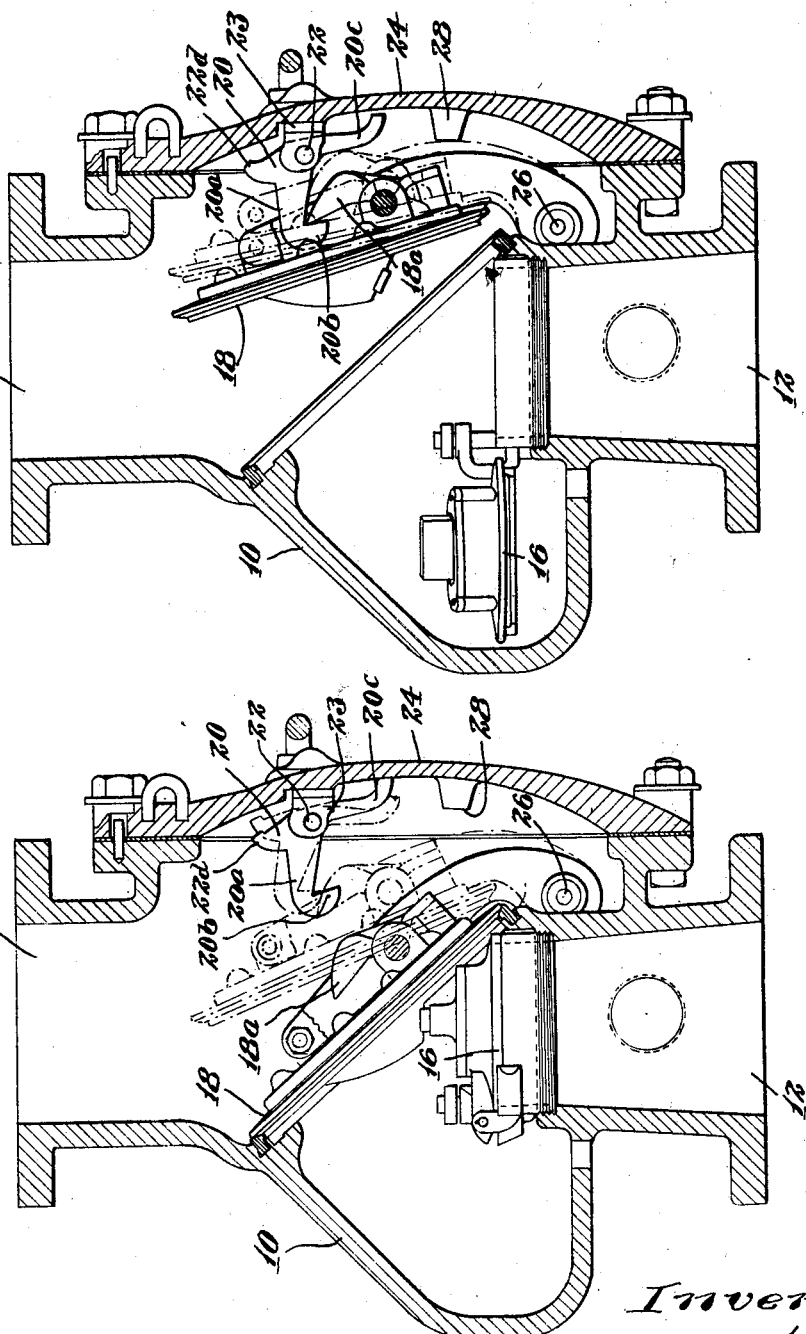
Inventor
Herbert E. Rose
by Mitchell, Chadwick & Kent
Attorneys Patented Apr. 2, 1929.

1,707,573

UNITED STATES PATENT OFFICE.

HERBERT E. ROSE, OF WARWICK, RHODE ISLAND, ASSIGNOR TO GENERAL FIRE EXTINGUISHER COMPANY, OF PROVIDENCE, RHODE ISLAND, A CORPORATION OF DELAWARE.

VALVE LATCH.

Application filed March 29, 1927. Serial No. 179,363.

This invention relates to improvements in valve latches. More especially it relates to a latch for locking a valve in a desired position, and which is positively moved by the valve into locking engagement therewith during the travel of the valve toward its locked position. Such a latch is particularly useful in connection with a dry pipe valve of an automatic sprinkler system and it is this application of the invention that is herein particularly described.

Dry pipe valves hold a supply of water under considerable pressure back from distributing pipes filled with air under a lower pressure. Upon the opening of an automatic sprinkler head the air pressure falls, and when the trip point is reached the high water pressure throws the valve open and the supply rushes into the distributing pipes. The valve then must be held open to prevent water columning, a condition which results when a valve that has opened for flow has closed again leaving a column of water above it whose weight is too great to be overcome by the supply pressure. Such re-closing of the valve may be caused either by the rebound of water back toward it from the air entrapped in the pipes, or may result from any sudden drop in pressure in the supply line occasioned, for example, by connecting a fire engine to the supply and the drawing of a considerable quantity of water therefrom. Accordingly dry pipe valves whose closing by surge is possible, after having opened for sprinkler discharge, have been provided with latches. The most common of these latches have depended upon gravity or a spring force to move them into locking position, and consequently there is always the possibility that they may not work, because of corrosion or sticking, or a broken spring.

The present invention provides a latch so organized and arranged that the valve in opening moves the latch initially in one direction to overcome any sticking and then moves it in the reverse direction into locking engagement with the valve. The initial application of force on the latch is gradually by a cam action to lessen the danger of breaking it or its pivotal support, while the second applied force acts through leverage to move the latch quickly into locking position.

As herein disclosed the latch is a bell crank lever pivoted within the casing of a dry pipe valve with one of its arms extending approximately horizontally from its pivot directly toward the swinging valve. The projecting end of this arm has a hook with rounded surface which is positioned in the path of a cam hook on the adjacent face of the valve. As the valve swings open its cam hook slides on the rounded face of the lever arm and applies thereto a powerful force, but as it does so gradually there can be no danger of breaking the latch as might occur if the force were applied suddenly. In consequence, any tendency of the latch to stick is overcome by the hook and arm riding upon the cam hook of the valve. As the latter passes by the hook of the bell crank lever, it encounters the other or depending arm on the other side of that lever's pivot, and accordingly swings the bell crank rapidly in the reverse direction bringing its hook down in front of the cam hook of the valve. Thus the latch is forced positively into locking position so that upon the rebound of the valve its own cam hook and the hook of the latch will interlock and prevent closing of the valve.

The invention is herein shown in its application to a dry pipe valve embodying differential of leverage and of area, as set forth in United States Letters Patent Nos. 1,196,874 and 1,196,875, granted September 5, 1915, to Albert J. Loepsinger, and in his present pending application Serial No. 67,527. But the invention may be applied to mechanical dry pipe valves and indeed to any valve having a member whose opening movement can be utilized to actuate a latch. It is intended that the patent shall cover by suitable expression in the appended claims whatever features of patentable novelty exist in the invention disclosed.

In the accompanying drawings:

Figure 1 is an elevation in section of a differential dry pipe valve embodying the invention, the air clapper being illustrated in closed position by full lines and in the act of opening by dotted lines; and Figure 2 is a similar view wherein the dotted lines represent the relative position of the clapper and latch as the former positively moves the latter to locking engagement, and the full lines represent the clapper latched open.

Referring to the drawings the differential dry pipe valve 10 has its inlet 12 at the bottom and its outlet 14 at the top of the casing. The valve proper embodies the water clapper 16 and the air clapper 18, the former being held closed against the supply pressure by pressure of the air confined in the distribution pipes of the system and exerted on the air clapper in accordance with the principles set forth in the aforementioned patents and pending application.

A latch 20 in the form of a bell-crank lever is pivoted at 22 on a mounting 23 carried by the cover 24 of a hand-hole opening of the casing. One arm 20$^a$ of the lever extends horizontally toward the air clapper and has an undercut hook 20$^b$ at its end. Its other arm 20$^c$ depends vertically and has a curved end which may rest against the cover 24 and when so engaged will position the lever with the rounded face of its hooked end in the path of a cam hook 18$^a$ provided on the adjacent side of the air clapper.

In operation, when a sprinkler head opens and the air pressure on clapper 18 drops to a point where the water supply pressure slightly exceeds the air pressure the valve will open and the extinguishing medium will rush into the distribution pipes. In opening the air clapper swings about its pivots 26 toward the cover 24, its cam hook 18$^a$ moving under and against the rounded arm 20$^a$ of the latch lever and gradually applying a force tending to swing the latch clockwise about its pivot 23 as indicated in dotted lines in Figure 1. A short arm 22$^d$ is also provided on the latch on its upper side to engage the cover, if necessary and prevent undue swinging in the clockwise direction. After the cam hook 18$^a$ of the clapper has passed the rounded line of the latch hook gravity may cause the latter to swing downward and engage the clapper hook. The movement of the clapper might be so rapid, however, that before the latch could fall the clapper would have struck the stop 28 on the cover and rebounded with its cam hook beyond reach of the latch hook. Moreover, experience has taught that the priming water provided above the air clapper while the valve is set awaiting action, may have effected corrosion of the latch pivot so that there is danger it may stick and stay up even after being swung up by the cam hook of the opening clapper. The present invention insures that the latch hook shall positively engage the clapper hook during the initial swing of the clapper. This is accomplished by arranging the two arms of the bell crank latch lever so that as the hook arm 20$^a$ is swung upward to allow the clapper hook 18$^a$ to pass under and beyond the hook 20$^b$, the depending arm 20$^c$ will be swung toward the clapper in position to be struck by cam hook 18$^a$ as the clapper continues its opening swing (indicated by dotted outline in Figure 2). In consequence, the movement of the latch lever is instantly reversed and its hook end 20$^b$ is positively swung downward behind the hook 18$^a$ of the clapper, ready to be engaged by the valve hook if the latter rebounds toward its seat. Accordingly the valve is locked open as shown in full lines in Figure 2. A resurge of water downward cannot close the clapper because of the hooked engagement; and any upward surge causing the clapper to swing further toward the cover also moves it toward the arm 20$^c$ of the latch (which at the same time may be also swung toward the clapper) and thus insures that the hook end of the lever will be kept in hook-engaging position with respect to the clapper. Thus the invention provides for the positive latching open of the valve on its initial opening swing and provides for the maintenance of the latched engagement during any subsequent movement of the valve caused by the action of the flowing water.

I claim as my invention:

1. The combination, with a valve having a swinging clapper, of a latch for holding the clapper open, the latch being mounted and adapted to be positively moved to latching position by the clapper itself when opening.

2. The combination with a dry pipe valve having a swinging clapper of a pivoted latch having a surface arranged to be engaged with the clapper on the opening movement of the clapper for swinging the latch in one direction and having an arm arranged to be engaged subsequently by the clapper and by its movement with the continued opening movement of the clapper to swing the latch in the reverse direction into latching position with respect to the clapper.

3. The combination with a valve having a swinging clapper of a latch for holding the clapper open after its initial opening, said latch comprising a pivoted bell-crank lever having a hook on one arm adapted to ride on the clapper as the latter swings open and to latch it open and having another arm arranged to be engaged by said clapper to swing said hook into said latching position with respect to the clapper.

4. The combination with a valve having a swinging clapper and a cam portion on the clapper, of a latch for holding the clapper open after its initial opening; said latch comprising a pivoted bell-crank lever having a hook on one arm adapted to ride on the said cam portion when the clapper swings open, and having its other arm in position to be engaged and rocked by the clapper during its swinging-open motion, thus positively moving said hook in front of said cam portion of the clapper to effect locking engagement therewith.

Signed at Providence, Rhode Island, this 26th day of March, 1927.

HERBERT E. ROSE.